US009800705B2

(12) United States Patent
Stahl et al.

(10) Patent No.: US 9,800,705 B2
(45) Date of Patent: Oct. 24, 2017

(54) REMOTE USER STATUS INDICATORS

(75) Inventors: Geoff Stahl, San Jose, CA (US);
Michael Dale Lampell, Woodside, CA (US); Laurent Baumann, Campbell, CA (US); Thomas Goossens, Paris (FR)

(73) Assignee: Apple Inc., Cupertino, CA (US)

( * ) Notice: Subject to any disclaimer, the term of this patent is extended or adjusted under 35 U.S.C. 154(b) by 1900 days.

(21) Appl. No.: 12/792,652

(22) Filed: Jun. 2, 2010

(65) Prior Publication Data

US 2011/0298618 A1    Dec. 8, 2011

(51) Int. Cl.
*H04M 11/04*    (2006.01)
*H04L 29/08*    (2006.01)
*H04M 1/725*    (2006.01)

(52) U.S. Cl.
CPC ...... *H04M 1/72519* (2013.01); *H04L 67/025* (2013.01); *H04L 67/24* (2013.01); *H04M 11/04* (2013.01)

(58) Field of Classification Search
CPC ....... H04L 67/24; H04L 51/04; H04L 51/043; H04L 69/329; H04L 51/38; H04L 67/04; H04L 29/06027; H04M 3/42365; H04M 3/42059; H04M 3/42093; H04M 2207/18; H04M 3/42374; H04M 2242/30; H04M 3/4211; H04M 3/42017; H04M 3/42102; H04M 3/537; G06Q 10/10; G06Q 10/109; G06Q 30/02; H04W 4/14; G06F 3/0482; G06F 9/24; G09D 3/00; H04N 21/2387; H04N 21/6587

USPC ............... 340/573.1, 10.4, 709.26
See application file for complete search history.

(56) References Cited

U.S. PATENT DOCUMENTS

| | | | | |
|---|---|---|---|---|
| 6,982,656 B1 * | 1/2006 | Coppinger | ............. | G06Q 10/08 340/426.19 |
| 6,988,128 B1 * | 1/2006 | Alexander | ........... | G06Q 10/109 709/206 |
| 7,299,257 B2 * | 11/2007 | Boyer | .................. | G06Q 10/107 709/204 |
| 7,606,862 B2 * | 10/2009 | Swearingen | ............ | H04L 51/04 709/204 |
| 7,657,632 B2 * | 2/2010 | Nakao | ..................... | H04L 67/14 709/223 |
| 7,958,212 B1 * | 6/2011 | Wong | .................... | H04L 51/043 709/203 |
| 8,019,875 B1 * | 9/2011 | Nielsen | ........................ | 709/227 |
| 8,082,302 B2 * | 12/2011 | Becker | ................. | G06Q 10/107 370/260 |

(Continued)

*Primary Examiner* — Fekadeselassie Girma
(74) *Attorney, Agent, or Firm* — Blank Rome LLP (57) ABSTRACT

A user interface on a device allows a user to set their remote user status for viewing by other individuals on their devices. The user or an application can select from a number of predefined remote user status indicators representing remote user status, and the user can optionally include a text message to be displayed with the remote user status indicator. The selected remote user status indicator and optional text message can be stored on a network and made available to other devices that have a contact database that includes the user as a contact. In some implementations, the remote user status indicator can be displayed proximate the user's name in a user interface, such as a favorites list, e-mail interface, text messaging interface, chat room, or any other user interface associated with an application.

21 Claims, 8 Drawing Sheets

(56) References Cited

U.S. PATENT DOCUMENTS

| | | | | |
|---|---|---|---|---|
| 8,082,552 B2* | 12/2011 | Agrawal | H04L 12/581 | 455/418 |
| 8,176,086 B2* | 5/2012 | John | H04M 3/42365 | 707/802 |
| 8,204,938 B2* | 6/2012 | Digate | G06Q 10/10 | 709/203 |
| 8,218,735 B2* | 7/2012 | Brunson | H04L 29/06027 | 370/352 |
| 8,285,312 B2* | 10/2012 | Rybak | G06Q 10/10 | 455/229 |
| 8,312,076 B2* | 11/2012 | Agrawal | H04L 12/581 | 709/203 |
| 8,319,816 B1 | 11/2012 | Swanson | H04L 12/1818 | 348/14.01 |
| 2002/0083127 A1* | 6/2002 | Agrawal | H04L 12/581 | 709/203 |
| 2002/0143876 A1* | 10/2002 | Boyer | G06Q 10/107 | 709/205 |
| 2004/0103157 A1* | 5/2004 | Requena | H04L 29/06 | 709/206 |
| 2005/0021777 A1* | 1/2005 | Nakao | H04L 69/329 | 709/228 |
| 2005/0120306 A1* | 6/2005 | Klassen | G06F 3/0482 | 715/765 |
| 2006/0015562 A1* | 1/2006 | Kilian-Kehr | H04L 67/04 | 709/206 |
| 2007/0058569 A1* | 3/2007 | McMenamin | H04L 29/06027 | 370/254 |
| 2007/0173284 A1* | 7/2007 | Chie | H04L 51/04 | 455/552.1 |
| 2007/0190956 A1* | 8/2007 | Chen | H04W 4/16 | 455/230 |
| 2007/0192418 A1* | 8/2007 | Adams | H04L 51/00 | 709/206 |
| 2008/0140559 A1* | 6/2008 | Ram | G06Q 40/06 | 705/37 |
| 2008/0140794 A1* | 6/2008 | Rybak | G06Q 10/10 | 709/207 |
| 2008/0197982 A1* | 8/2008 | Sadr | | 340/10.4 |
| 2008/0209076 A1* | 8/2008 | Wang | G06F 9/24 | 709/250 |
| 2009/0083676 A1* | 3/2009 | Flanagan et al. | | 715/853 |
| 2009/0119603 A1* | 5/2009 | Stackpole | G06Q 10/109 | 715/753 |
| 2009/0139121 A1* | 6/2009 | Bury | B42D 5/06 | 40/121 |
| 2009/0172103 A1* | 7/2009 | Tuli | G06Q 10/10 | 709/206 |
| 2009/0280843 A1* | 11/2009 | Wisebourt et al. | | 455/466 |
| 2009/0300525 A1* | 12/2009 | Jolliff | H04M 1/72544 | 715/764 |
| 2010/0144345 A1* | 6/2010 | Darrow | H04W 4/16 | 455/434 |
| 2010/0205272 A1* | 8/2010 | Cheung | G06Q 10/10 | 709/206 |
| 2010/0235505 A1* | 9/2010 | Gupta | G06Q 10/107 | 709/225 |
| 2010/0241664 A1* | 9/2010 | LeVasseur | H04M 3/4872 | 707/779 |
| 2010/0281364 A1* | 11/2010 | Sidman | G06F 17/30595 | 715/713 |
| 2011/0173260 A1* | 7/2011 | Biehl | G06Q 10/06 | 709/204 |
| 2011/0231874 A1* | 9/2011 | Goode | G06Q 10/10 | 725/37 |
| 2011/0241882 A1* | 10/2011 | Gonzales | G06Q 30/0281 | 340/572.1 |
| 2011/0289200 A1* | 11/2011 | Patil | G06F 9/5027 | 709/223 |
| 2011/0298618 A1* | 12/2011 | Stahl | H04M 1/72519 | 340/573.1 |
| 2011/0302253 A1* | 12/2011 | Simpson-Anderson | H04L 51/04 | 709/206 |
| 2012/0009908 A1* | 1/2012 | Wisebourt | H04L 51/043 | 455/414.2 |
| 2012/0016935 A1* | 1/2012 | Huang | H04M 3/42017 | 709/203 |
| 2012/0134321 A1* | 5/2012 | Amidon | H04W 76/02 | 370/328 |
| 2012/0311014 A1* | 12/2012 | Jindal | H04L 67/24 | 709/202 |

* cited by examiner

REMOTE USER STATUS INDICATORS

TECHNICAL FIELD

This disclosure relates generally to communication devices, such as mobile smart phones with telephony, e-mail or text messaging capability.

BACKGROUND

Modern mobile devices may include a variety of communication applications, such as telephony, text messaging and e-mail. These applications often include a contacts database or "address book" containing telephone numbers (e.g., work, mobile, facsimile) and e-mail addresses of contacts known to the user of the device. The user can access the contacts database on the mobile device to simplify and quicken communication with the known contacts (e.g., friends, family, coworkers, clients).

A common problem with using contacts on mobile devices is that the remote user status of the contacts is typically unknown to the user. For example, the user may call a contact's mobile device in a different time zone at an inappropriate time (e.g., late at night) because the user was unaware (or forgot) that the contact was traveling. Some contacts may be too busy to receive a call or text message but would like to receive the call or text message at a later time. Some contacts are engaged in activities that prevent them from accepting a call or text message, such as playing sports. Some contacts may be traveling and cannot be reached due to technology constraints (e.g., while traveling on an airplane).

Conventional telephone systems may provide call recipients the name or telephone number of the caller, often referred to as "Caller ID." Such systems may not alert the caller of the current status of the call recipient prior to the call being placed. Rather, after the call is placed, the call recipient may not answer or the caller may receive a busy signal or answering machine. In some cases, the call recipient answers the call but then asks the caller to call back later. If the call recipient cannot talk, the caller may still be charged for completion of the call by the carrier.

SUMMARY

A user interface on a device allows a user to set their remote user status for viewing by other individuals on their devices. The user or an application can select from a number of predefined remote user status indicators representing remote user status, and can optionally include a text message to be displayed with the remote user status indicator. The selected remote user status indicator and optional text message can be stored on a network and made available to other devices that have a contact database that includes the user as a contact.

In some implementations, the remote user status indicator can be displayed with the user's name in a user interface, such as a contact record, favorites list, e-mail interface, text messaging interface, chat room, or any other user interface. For example, when the user enters a favorites list an icon representing remote user status can be displayed next to a contact's name, together with a text message.

In some implementations, remote user status can be determined based on interactions of a contact with an online application. For example, a contact may be interacting with a social network or online game environment when an attempt to communicate with the contact is made. The remote user status indicator can indicate to the calling party (prior to an attempt to call, email or text the contact) that the contact can be reached on the social network or the online gaming environment.

These features provide advantages over conventional communication applications by enabling a user to instantly know the remote user status of a contact prior to attempting communication. Such features can provide another form of communication and can save the user from awkward or embarrassing situations. These features can also save the user money by not completing calls that are uninvited.

The details of one or more implementations of remote user status indicators are set forth in the accompanying drawings and the description below. Other features, aspects, and advantages of remote user status indicators will become apparent from the description, the drawings, and the claims.

BRIEF DESCRIPTION OF THE DRAWINGS

Like reference symbols in the various drawings indicate like elements.

DETAILED DESCRIPTION

Overview of Remote User Status Indicators

Figure 1:
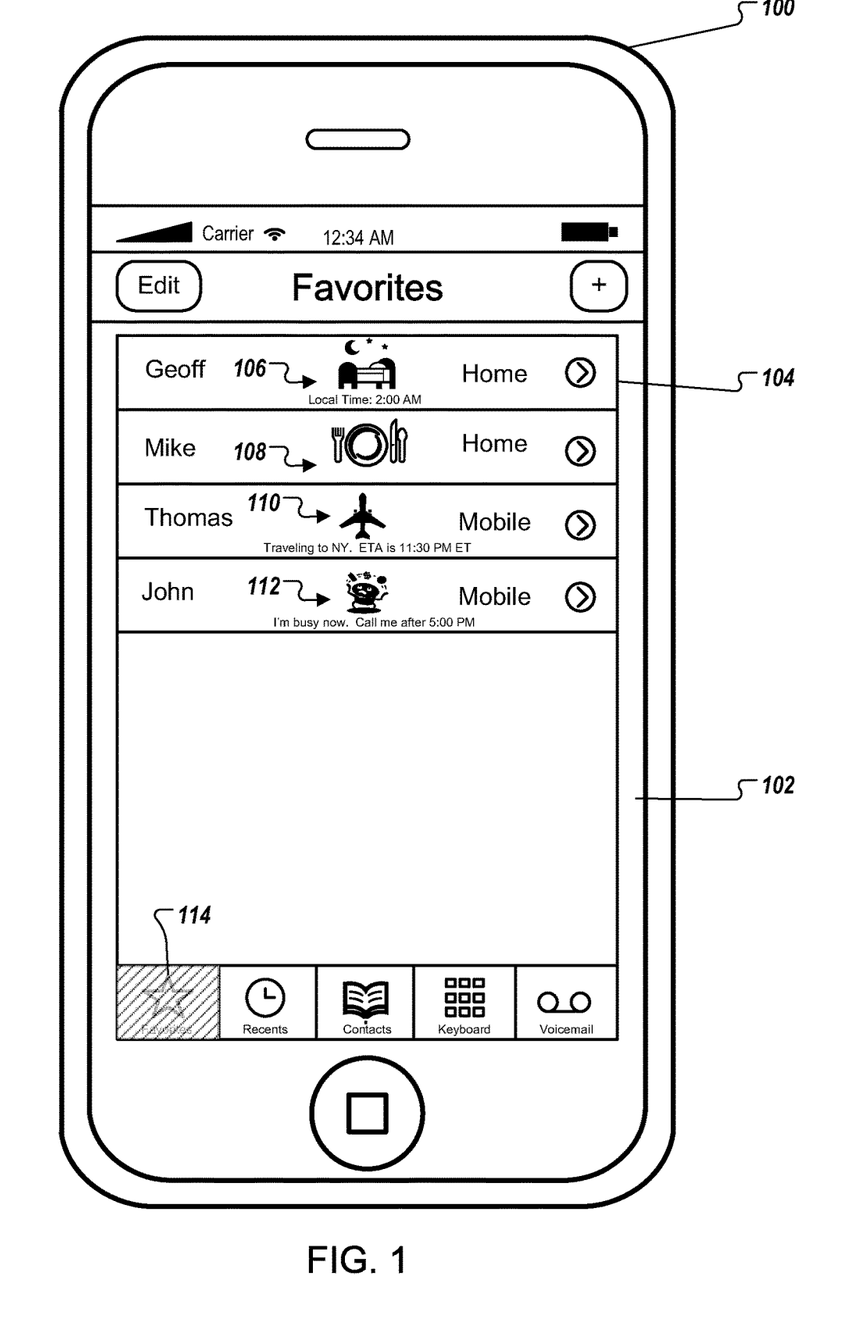
FIG. 1 illustrates an exemplary user interface of a communication application displaying remote user status indicators.

FIG. 1 illustrates an exemplary user interface of a communication application displaying remote user status indicators. In some implementations, communication device 100 includes display surface 102 for presenting communication interface 104. Communication device 100 can be a mobile device, e-mail device, game console, television screen, personal computer, electronic tablet, media player or any other device with communication capability. The display surface 102 can be a touch sensitive surface capable of responding to multi-touch input with one or more fingers or a stylus.

In the example shown, communication interface 104 is a "Favorites" list displayed in response to selection of a Favorites button 114. The Favorites list includes 4 contacts: Geoff, Mike, Thomas and John. The Favorites list can include contacts stored in a local or remote contacts database that were selected by the user of device 100 to be included in the Favorites list. The Favorites list can include a user interface element for each contact in the Favorites list that can be selected (e.g., touched) by the user to initiate a telephone call, e-mail or text message. In the present example, a first user interface element associated with Geoff includes a remote user status indicator 106, a second user interface element associated with Mike includes a remote user status indicator 108, a third user interface element associated with Thomas includes a remote user status indicator 110, and a fourth user interface element associated with John includes a remote user status indicator 112. Remote user status indicators can be icons, thumbnail images, avatars, symbols, pictograms or any other visual indicator of remote user status.

In this example, Geoff is currently sleeping and has set his remote user status indicator 106 to reflect his status. Additionally, local time is displayed in the user interface element to remind the user of device 100 that Geoff is currently in a different time zone. In some implementations, the local time for Geoff can automatically be displayed with the remote user status indicator 106. A local time source can be provided by a clock on Geoff's device, by a network service 830 (e.g., Network Time Protocol) or obtained from any other available clock source (e.g., GPS, system clock). Geoff's remote user status indicator 106 warns the user of device 100 (prior to the user making a call to Geoff) that Geoff is currently sleeping and unavailable to receive the call.

In some implementations, a current geographic location of Geoff can be displayed with the remote user status indicator 106. The current geographic location of Geoff can be uploaded from Geoff's communication device if his device has location-aware capability (e.g., GPS) or determined by a network service (e.g., WiFi, cell id).

Mike is currently eating and has set his remote user status indicator 108 to reflect his status. Mike has not included a text message. Mike's remote user status indicator 108 warns the user of device 100 (prior to the user making a call to Mike) that Mike is currently eating and unavailable or unwilling to receive the call.

Thomas is currently traveling on an airplane and has set his remote user status indicator 110 to reflect his status. In some implementations, remote user status indicator 110 can be automatically set when Mike engages an "airplane mode" on his device, which disables wireless communications. In other implementations, remote user status indicator 110 can be set based on position coordinates (e.g., altitude), which can be obtained from an onboard positioning technology on Thomas' device (e.g., GPS receiver). Thomas has also added a text message: "Traveling to NY. ETA is 11:30 PM ET" The text message is displayed under the indicator 110 to provide further information regarding the destination of Thomas' flight and his estimated arrival time.

John is currently busy and has set his remote user status indicator 112 to reflect his status. John also include a text message: "I'm busy now. Call me after 5:00 PM." The text message provides the user of device 100 a time after which John can be reached. In some implementations, remote user status indicator 112 can be automatically set based on a time period specified by John. Additionally or alternatively, an electronic calendar on John's device can be used to automatically determine when John will not be available to receive a call, e-mail or text message.

The remote user status indicators displayed in the Favorites list of FIG. 1 are examples of remote user status indicators. Remote user status indicators can also indicate when a contact is interacting with an online application. For example, if a contact is currently interacting with an online application (e.g., social network, online game, blog), the contact may want to indicate his remote user status to other devices through a remote user status indicator. Text messages associated with remote user status indicators can be used to invite others to join in the online applications, as described in reference to FIG. 3.

Figure 2:
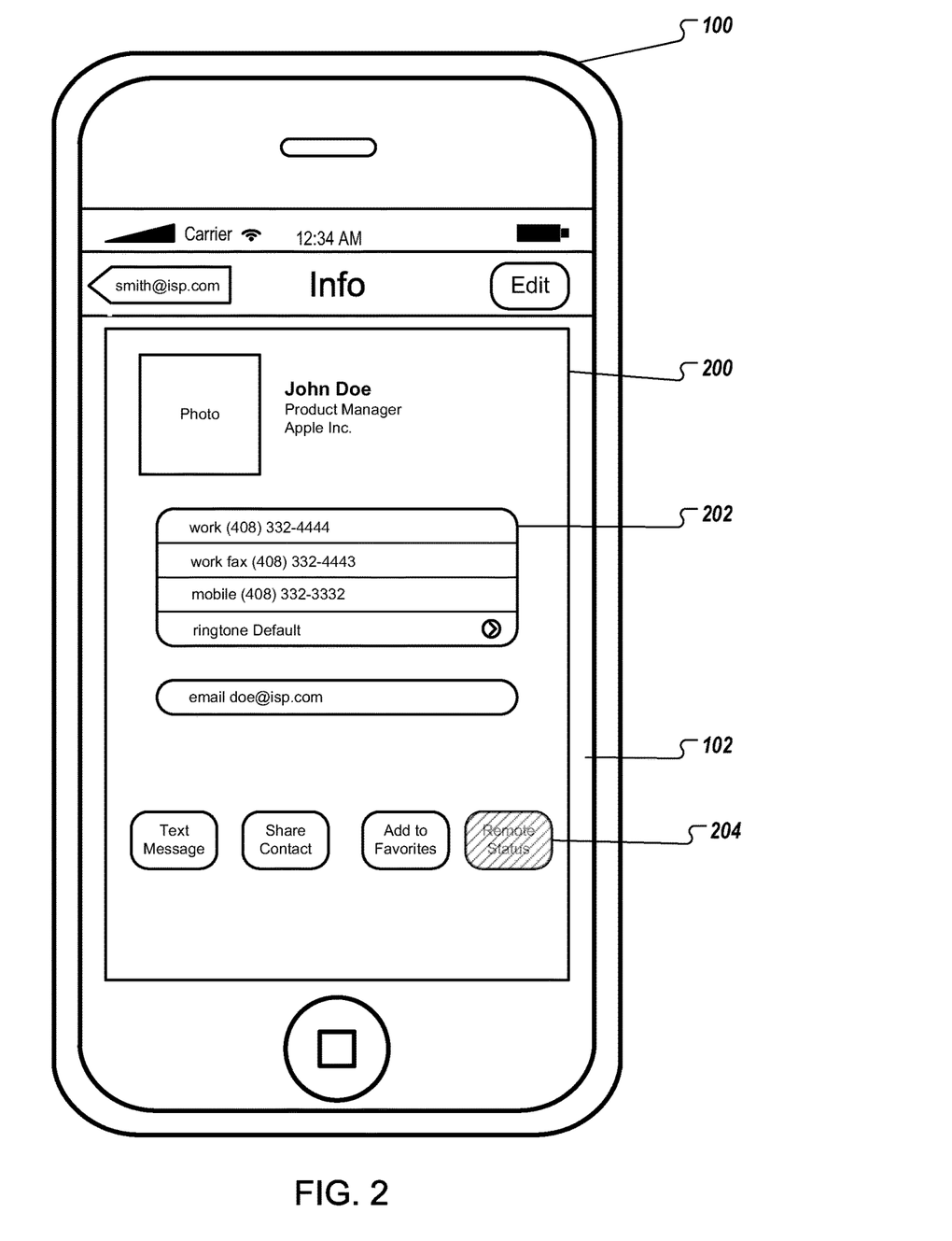
FIG. 2 illustrates an exemplary user interface for a contact with a remote user status option.

FIG. 2 illustrates an exemplary user interface for a contact with a remote user status option. In some implementations, a user can set their current remote user status in a contact 200. A contact can include contact information 202, a picture and other functions, such as text messaging, sharing contacts and adding to favorites. In some implementations, a button 204 for selecting a remote user status dialog can be included in contact 200. Button 204 can serve as an "opt-in" mechanism to allow a user to control their privacy. The remote user status can be automatically disabled based on a trigger event (e.g., the expiration of a time period) to ensure that the user does not inadvertently leave the remote user status on. In some implementations, the user can be provided with a visual reminder that the remote user status is enabled or disabled.

Figure 3:
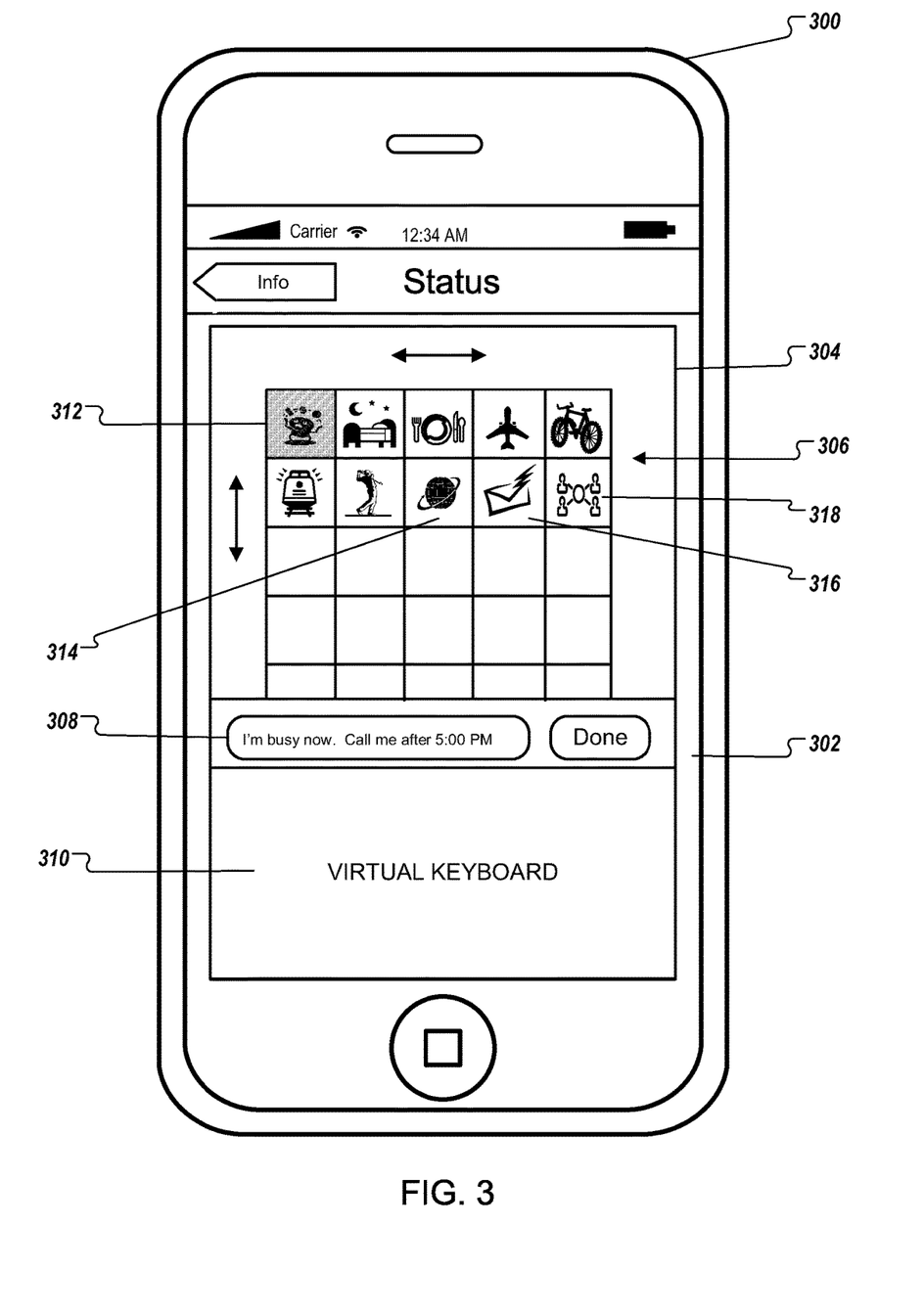
FIG. 3 illustrates an exemplary user interface for selecting remote user status indicators and entering text messages.

FIG. 3 illustrates an exemplary user interface for selecting remote user status indicators and entering text messages. In some implementations, a user of communication device 300 can select a remote user status indicator from a grid view 306 displayed in user interface 304 presented on display surface 302. If display surface 302 is touch sensitive, then a user can use touch gestures to manipulate grid view 306 in the vertical direction to view hidden portions of grid view 306, or horizontally to display a new page with a different grid view. Accordingly, grid views can be organized by categories or topics. For example, one grid view can include cells displaying remote user status indicators relating to travel (e.g., icons of boats, trains, planes, cars). Another grid view (e.g., on a different page) can include cells displaying remote user status indicators relating to sports (e.g., icons of golf, skiing, tennis, biking). In the example shown, grid view 306 includes a mix of different types of remote user status indicators.

Continuing with the example from FIG. 1, device 300 is operated by John who has selected cell 312, which displays the remote user status indicator shown in FIG. 1, indicating that John is currently too busy to accept a call. Upon selection of cell 312, a text box 308 and a virtual keyboard 310 are displayed. John can use the text box 308 and virtual keyboard 310 to type the text message: "I'm busy now. Call me after 5:00 PM." When the text message is completed, John can click or touch the "Done" button. Upon activation of the "Done" button, the text message in text box 308 and the selected remote user status indicator displayed in cell 312 are made available to other devices through a network service 830, as described in reference to FIG. 8.

In some implementations, the remote user status indicator and associated text (if any) can be downloaded from the network service 830 to other devices using known and/or standardized communication protocols for data or multimedia transfer, including but not limited to: Short Message Service (SMS), Multimedia Messaging Service (MMS), Simple Mail Transfer Protocol (SMTP) and Transmission Control Protocol/Internet Protocol (TCP/IP). The remote user status for a number of users (e.g., subscribers) can be stored in database 846.

Continuing with the current example, when the user of communication device 100 selects his Favorites list, device 100 requests remote user status indicators for the contacts in the Favorites list from network service 830. Network service 830 checks database 846 to determine if the contacts in the Favorites list have remote user status indicators. Contacts that have set their remote user status to on (e.g., as indicated by a field in database 846) will have their remote user status indicators and any associated text message sent to requesting devices. In this example, John's remote user status indicator and text message were sent by network service 830 to device 100, where the remote user status indicator and text message were displayed next to John's name in the Favorites list.

In some implementations, remote user status indicators can represent applications that the contact is currently interacting with. For example, remote user status indicators displayed in cells 314, 316 and 318 indicate that John is interacting with a Web browser, e-mail and social network, respectively. For example, if John selects cell 318, and inputs the text message "I'm on social network A, please join me now," then other users are invited to join John on social network A, rather than trying communicate with John through a telephone call, e-mail or text message.

Figure 4:
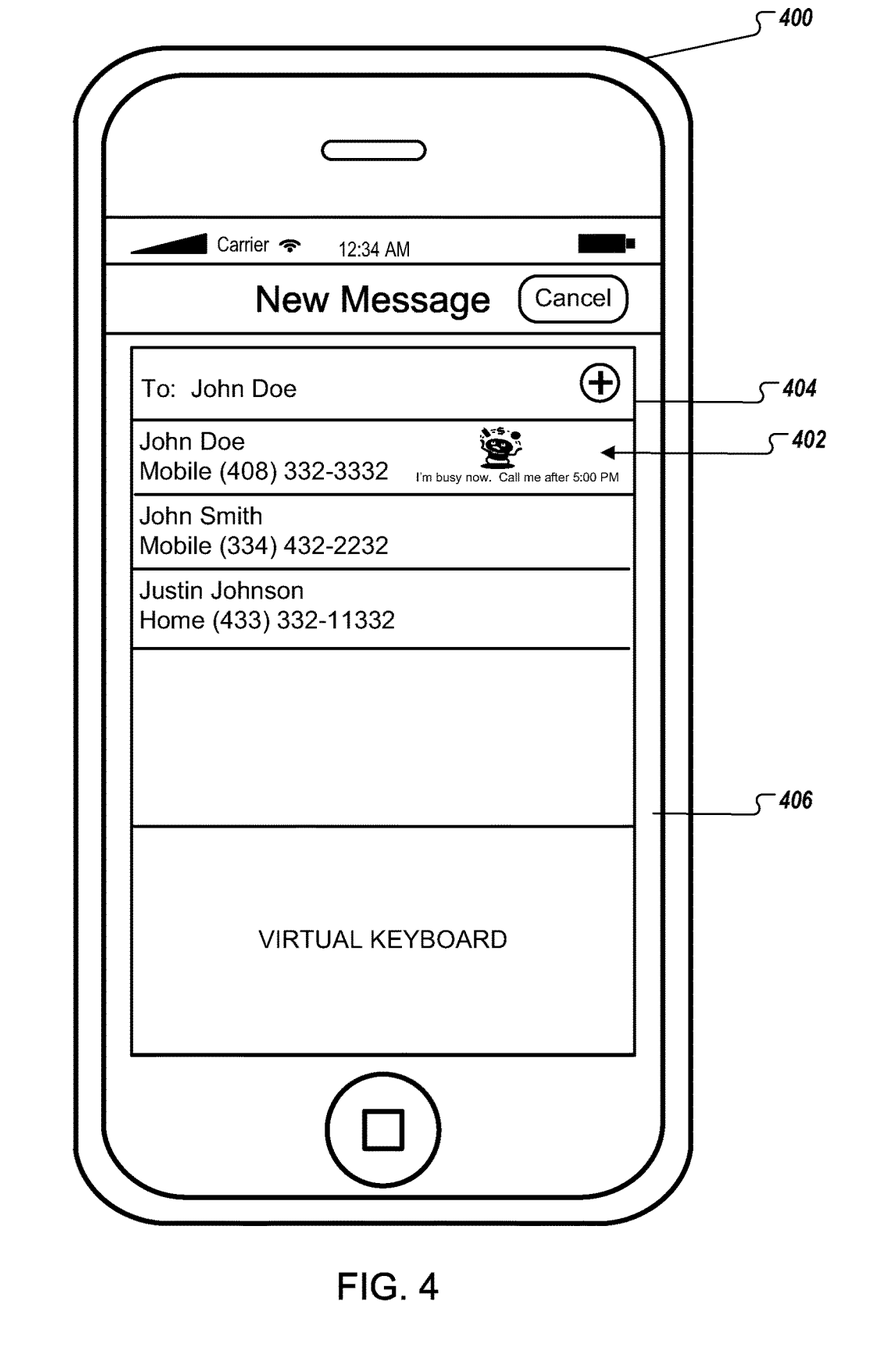
FIG. 4 illustrates an exemplary user interface for text messaging with remote user status indicators.

FIG. 4 illustrates an exemplary user interface for text messaging with remote user status indicators. In some implementations, remote user status indicator 402 and associated text, if any, can be displayed in a text message user interface 404 presented on a display surface 402 of communication device 400. Similarly, remote user status indicators can be displayed in an e-mail user interface, on a personal page of a social network, in an online gaming environment, in a chat room or in any other application where a user may desire to display their remote user status.

Exemplary Processes for Remote User Status Indicators

Figure 5:
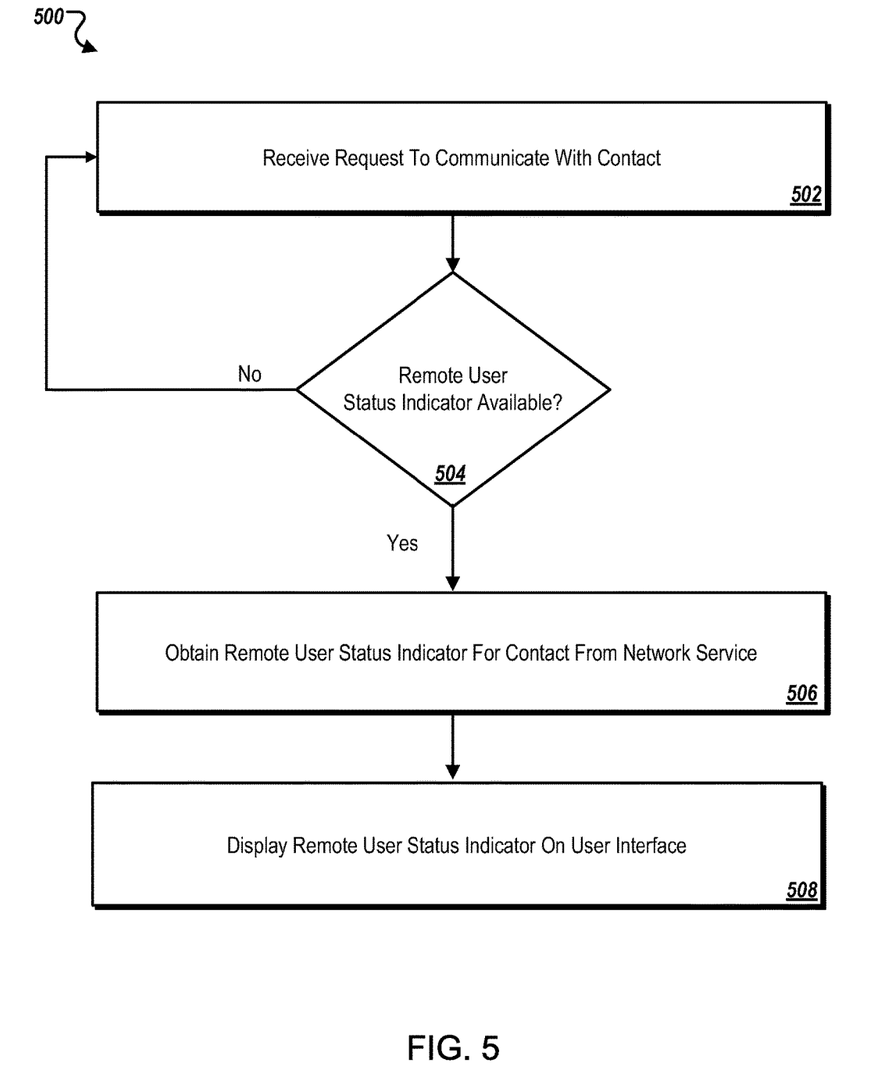
FIG. 5 is a flow diagram of an exemplary process for displaying remote user status indicators on a device.

FIG. 5 is a flow diagram of an exemplary process 500 for displaying remote user status indicators on a device. Process 500 can be implemented by the device architecture and operating environment shown in FIGS. 7 and 8, respectively.

In some implementations, process 500 can begin by receiving a request to communicate with a contact (502). A request to communicate with a contact can be initiated by a variety of trigger events, including but not limited to the requestor invoking a communication application (e.g., telephony, e-mail, text messaging, online gaming). In the example of FIG. 1, a request to communicate with a contact occurred when the user entered their Favorites list of a telephony application. Other trigger events are also possible.

In response to the request to communicate with a contact, the communication device (e.g., a baseband and/or application processor on the device) communicates with network service 830 to determine if a remote user status is available for the requested contact (504). If a remote user status for the contact is available, then the device obtains the remote user status indicator (and text message if available) for the contact from the network service (506). The remote user status indicator (and text message if available) can then be displayed on a user interface of the device (508).

Figure 6:
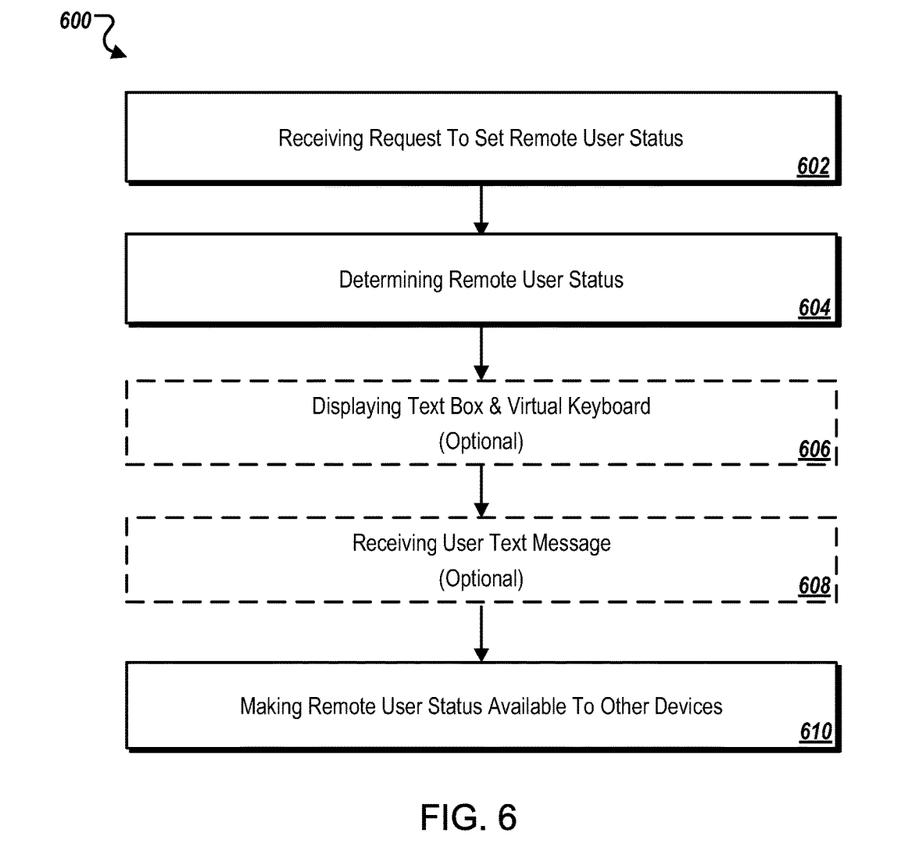
FIG. 6 is a flow diagram of an exemplary process for selecting remote user status indicators on a device.

FIG. 6 is a flow diagram of an exemplary process 600 for selecting remote user status indicators on a device. Process 600 can be implemented by the device architecture and operating environment shown in FIGS. 7 and 8, respectively.

In some implementations, process 600 can begin by receiving a request to set remote user status (602). The request can be set manually by a user as described in reference to FIG. 2, or set by an application through an Application Programming Interface (API). Next, process 600 determines remote user status (604). In some implementations, remote user status is determined based on manual input of the user. For example, the user can activate a mechanical or virtual button (e.g., virtual button 204) or other user interface element to set remote user status. Alternatively, remote user status can be set automatically by an application or based on a trigger event.

If the user performs the procedure of FIG. 3, then a text box and virtual keyboard can be displayed to allow the user to create a text message to be displayed with the remote user status indicator (606). If the device does not have a touch sensitive display surface, then the user can type a text message in the text box with a hardware keyboard. If step 606 is performed, then process 600 receives a user text message (608).

After the completion of steps 604 or 608, the determined remote user status indicator and optional text message can be made available to other devices (610). For example, data (e.g., a remote user status indicator, optional text message) representing the remote user status can be uploaded and stored in a database of a network service that is accessible by other devices requesting the remote user status.

Exemplary Mobile Device Architecture

Figure 7:
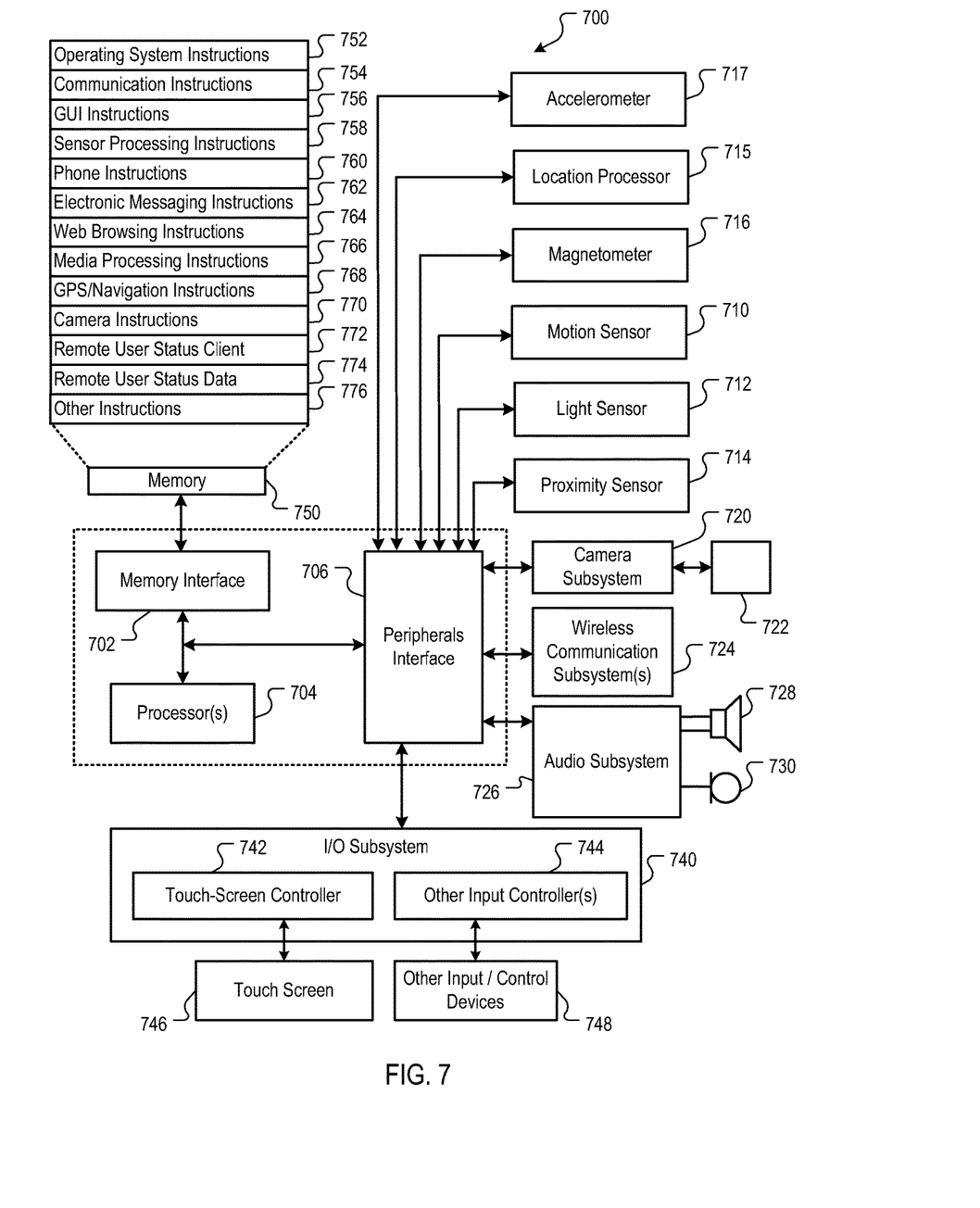
FIG. 7 is a block diagram of an exemplary hardware architecture for selecting and displaying remote user status indicators.

FIG. 7 is a block diagram of an exemplary hardware architecture for selecting and displaying remote user status indicators. The device can include memory interface 702, one or more data processors, image processors and/or processors 704, and peripherals interface 706. Memory interface 702, one or more processors 704 and/or peripherals interface 706 can be separate components or can be integrated in one or more integrated circuits. The various components in the device, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a WiFi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to the device on or off. The user may be able to customize a functionality of one or more of the buttons. The touch screen 746 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; and camera instructions 770 to facilitate camera-related processes and functions. The memory 750 may also store other software instructions (not shown), such as security instructions, web video instructions to facilitate web video-related processes and functions, and/or web shopping instructions to facilitate web shopping-related processes and functions.

Memory 750 can include instructions for a remote user status client 772 and remote user status data 774, as well as other instructions 776 for implementing the feature, user interfaces, and processes described in reference to FIGS. 1-6.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
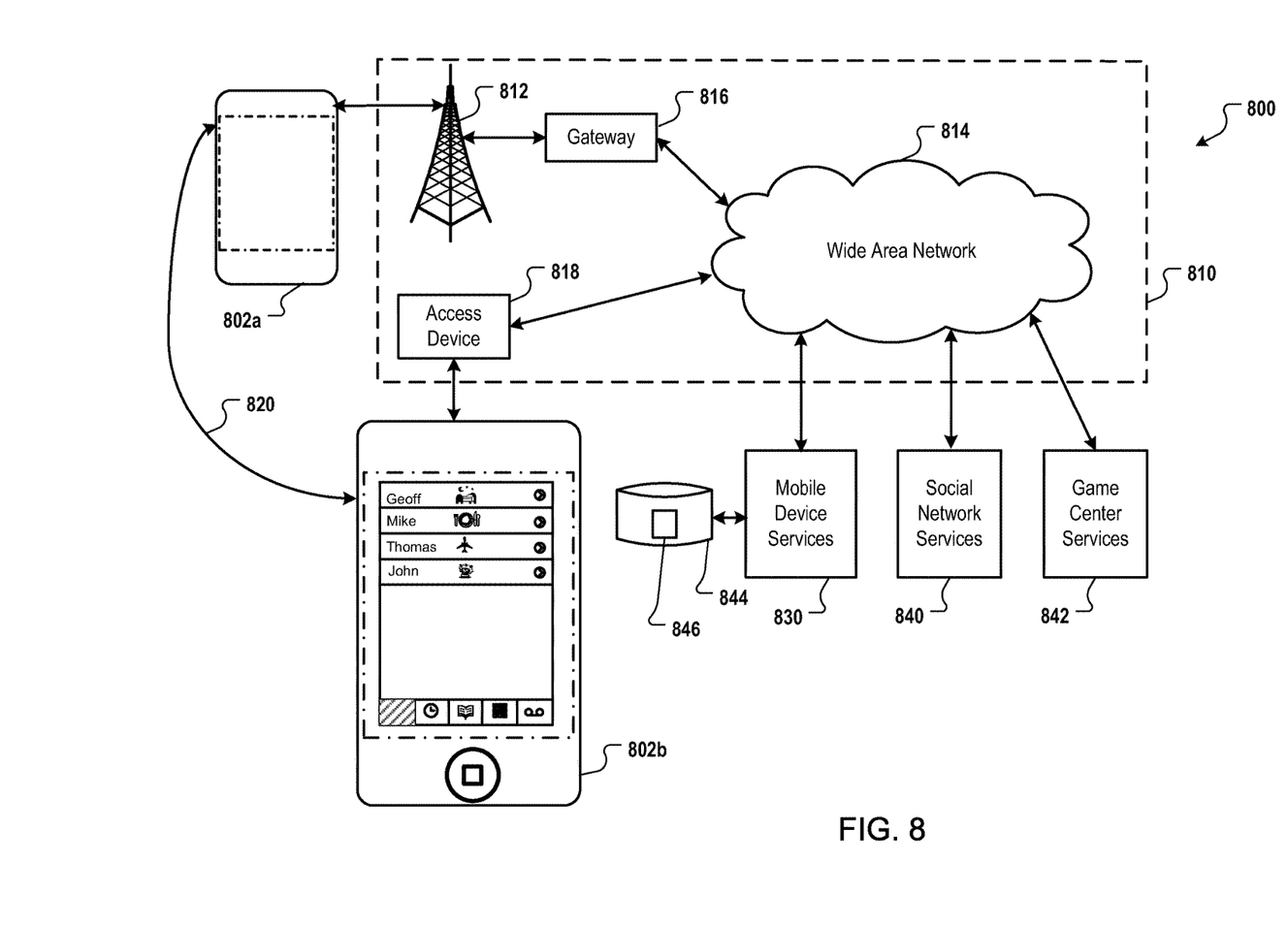
FIG. 8 is a block diagram of an exemplary network operating environment for a device for selecting and displaying remote user status indicators.

FIG. 8 is a block diagram of an exemplary network operating environment for a device for selecting and displaying remote user status indicators. In this example, devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814. Although this example illustrates an operating environment for mobile devices, the operating environment can also be applied to a device that is wired to a network (e.g., a desktop computer).

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, device 802a or 802b can be physically connected to the access device 818 using one or more cables and the access device 818 can be a personal computer. In this configuration, device 802a or 802b can be referred to as a "tethered" device.

Devices 802a and 802b can also establish communications by other means. For example, wireless device 802a can communicate with other wireless devices, e.g., other devices 802a or 802b, cell phones, etc., over the wireless network 812. Likewise, devices 802a and 802b can establish peer-to-peer communications 820, e.g., a personal area network, by use of one or more communication subsystems, such as the Bluetooth™ communication devices. Other communication protocols and topologies can also be implemented.

Device 802a or 802b can communicate with a variety of network services over the one or more wired and/or wireless networks. In some implementations, network services can include mobile device services 830, social network services 840, and game center services 842.

Mobile device services 830 can provide a variety of services for device 802a or 802b, including but not limited to mail services, text messaging, chat sessions, videoconferencing, Internet services, location based services (e.g., map services), sync services, remote storage 844, downloading services, etc. Remote storage 844 can be used to store remote user status data (e.g., remote user status indicators and any associated text message), which can be used on multiple devices of the user or shared by multiple users.

In some implementations, services 830 can provide users with a design tool for designing their only remote user status indicators and also allow the user to search and download remote user status indicators provide by the services 830 or shared by other users.

In some implementations, social networking services 840 can provide a social networking website, where a user of device 802a or 802b can set up a personal network and invite friends to contribute and share content. Remote user status indicators and associated text messages can be displayed on the personal pages of various social contacts (e.g., friends list, buddy list).

In some implementations, game center services 842 can provide an online gaming environment, where users of device 802a or 802b can participate in online interactive games. In some implementations, remote user status indicators and associated text messages can be displayed to online gamers.

Device 802a or 802b can also access other data and content over the one or more wired and/or wireless networks. For example, content publishers, such as news sites, Rally Simple Syndication (RSS) feeds, web sites, blogs, social networking sites, developer networks, etc., can be accessed by device 802a or 802b. Such access can be provided by invocation of a web browsing function or application (e.g., a browser) in response to a user touching, for example, a Web object.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A computer-implemented method performed by one or more processors, comprising:
  receiving, from a first device, a remote user status, wherein the remote user status is automatically determined based on an activity of the first device with an online application running on the first device;

assigning the received remote user status to a current activity status of the first device to indicate the first device is active with the online application, wherein the current activity status identifies the online application;

receiving, from a second device, a request to communicate with the first device; and providing, in response to the request, the first device's current activity status to the second device.

2. The method of claim 1, wherein the online application is a social media application.

3. The method of claim 1, further comprising:

detecting an attempt at the first device to communicate with a second device;

retrieving an activity status associated with the second device; and transmitting the retrieved activity status to the first device.

4. The method of claim 1, wherein the activity status is automatically determined based, at least in part, on an indication by a calendar application that a meeting is scheduled to begin at a first time, the method further comprising:

assigning the received activity status to a current activity status of the first device to indicate the meeting has started, wherein the current activity status identifies the first time;

receiving, from a second device, a request to communicate with the first device; and providing, in response to the request, the first device's current activity status to the second device.

5. The method of claim 4, wherein the calendar application further indicates that the meeting is scheduled to end at a second time, and wherein the assigned current activity status further indicates the meeting ended at the second time.

6. The method of claim 4, wherein providing the first device's current activity status to the second device comprises providing a text message to the second device.

7. The method of claim 1, wherein assigning the current activity status comprises indicating that the first device is available for communication.

8. The method of claim 1, further comprising:

receiving, from the first device, an indication that the remote user status is not available.

9. The method of claim 1, further comprising:

providing, to the first device, a reminder that the remote user status is enabled or disabled.

10. The method of claim 1, further comprising:

receiving, from the first device, an indication that the remote user status has been disabled, the disabling having been caused, at least in part, by the expiration of a time period.

11. The method of claim 1, wherein the online application comprises at least one of a social networking application, a gaming application, and a blog application.

12. A non-transitory computer storage medium encoded with a computer program, the computer program comprising instructions that when executed by a data processing apparatus cause the data processing apparatus to:

receive, from a first device, an activity status that is automatically determined based, at least in part, on an activity of the first device with an online application;

assign the received activity status to a current activity status of the first device to indicate the first device is active with the online application, wherein the current activity status identifies the online application;

receive, from a second device, a request to communicate with the first device; and provide, in response to the request, the first device's current activity status to the second device.

13. The non-transitory computer storage medium of claim 12, wherein the online application is a specific social media application that is currently active on the first device.

14. The non-transitory computer storage medium of claim 13, wherein the instructions to cause the data processing apparatus to assign the received activity status to the current activity status comprise instructions to cause the data processing apparatus to assign the activity status to indicate the first device is active on the specific social media application.

15. The non-transitory computer storage medium of claim 12, further comprising instructions to cause the data processing apparatus to:

detect an attempt on the first device to communicate with a second device;

retrieve an activity status associated with the second device; and display the retrieved activity status associated with the second device on the first device.

16. The non-transitory computer storage medium of claim 12, wherein the instructions to cause the data processing apparatus to provide, in response to the request, the first device's current activity status to the second device comprise instructions to cause the data processing apparatus to provide, to the second device, a text message indicating the current activity status of the first device.

17. The non-transitory computer storage medium of claim 12, the computer program further comprising instructions that when executed by a data processing apparatus cause the data processing apparatus to:

receive, from the first device, an indication that the remote user status is not available.

18. The non-transitory computer storage medium of claim 12, the computer program further comprising instructions that when executed by a data processing apparatus cause the data processing apparatus to:

provide, to the first device, a reminder that the remote user status is enabled or disabled.

19. The non-transitory computer storage medium of claim 12, the computer program further comprising instructions that when executed by a data processing apparatus cause the data processing apparatus to:

receive, from the first device, an indication that the remote user status has been disabled, the disabling having been caused, at least in part, by the expiration of a time period.

20. The non-transitory computer storage medium of claim 12, wherein the online application comprises at least one of a social network application, a gaming application, and a blog application.

21. The non-transitory computer storage medium of claim 12, wherein the instructions that when executed by a data processing apparatus cause the data processing apparatus to provide the first device's current activity status to the second device include instructions that when executed by a data processing apparatus cause the data processing apparatus to provide an icon representative thereof.

* * * * *